United States Patent Office 3,027,402
Patented Mar. 27, 1962

3,027,402
METHOD FOR PREPARING ALPHA-HALO ACRYLIC ACIDS AND ESTERS THEREOF
Charles J. Pennino, Monroeville, Pa., assignor to The B. F. Goodrich Company, New York, N.Y., a corporation of New York
No Drawing. Filed May 3, 1960, Ser. No. 26,427
12 Claims. (Cl. 260—486)

This invention is concerned with the preparation of alpha-halogenated vinyl carboxylates and more particularly pertains to a novel method for the preparation of alpha-halogenated acrylic acids and esters thereof.

Several methods for the preparation of alphahalogenated acrylic acids and alpha-halogenated acrylic esters have been previously described. The most commonly used prior procedures have involved the dehydrohalogenation of alpha,beta-dihalopropionic acid and alpha,beta-dihalopropionic acid esters. Generally speaking the methods of the prior art are complex employing numerous steps, expensive chemical reagents and seldom produce high yields. The usefulness of alpha-halo acrylic acids and alpha-halo acrylic esters in the formation of plastics, elastomers and adhesives is well known. These monomers have not been fully exploited primarily because they are not readily available and are quite expensive when compared with more common vinyl monomers.

An object of this invention is the provision of a novel process for preparing alpha-halo acrylic acid esters. Another object is the provision of a novel process for the preparation of alpha-halo acrylic acids. The accomplishment of these and other objects will become apparent from the following description and examples, it being understood that numerous changes and modifications can be made in the process disclosed herein by those skilled in the art without a departure from the spirit and scope of this invention.

In my copending application, Serial No. 26,417, filed May 3, 1960, now U.S. Patent 3,001,921, I have described and claimed a novel polyester of an alpha-halo beta-hydroxy propionic acid or alpha-halo beta-propiolactone polymer having the structure

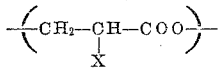

wherein X is a halogen atom such as Cl, Br, F or I. The alpha-halogenated beta-propiolactone polymers are prepared by halogenating a beta-propiolactone polymer having the unit structure

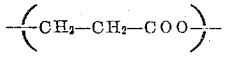

under carefully controlled conditions. The alpha-halo beta-propiolactone polymer described and claimed in my copending application has an average molecular weight of from about 800 to about 2,000. Beta-propiolactone polymer is more fully described in J. Am. Chem. Soc., 70, 998 (1948).

I have discovered a novel process for preparing compounds of the formula

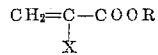

wherein X is a halogen atom and R is a member selected from the class consisting of hydrogen and an aliphatic hydrocarbon group having from 1 to 8 carbon atoms said process comprising heating a member of the group consisting of (1) a polymer of the formula

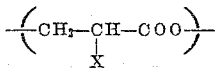

wherein X is a halogen atom and (2) a polymer of the formula

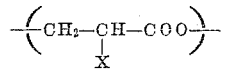

wherein X is a halogen atom, an aliphatic monohydric alcohol having from 1 to 8 carbon atoms and a mineral acid.

In the preferred process of this invention the alpha-halogenated beta-propiolactone polymer is pyrolyzed at a temperature of from about 140 to 220° C. and the alpha-halo acrylic acid is sublimed off rapidly and collected on a cooled surface as it forms. Alternatively, the alpha-halo beta-propiolactone polymer is allowed to react with at least a molar equivalent of an alcohol, for example methanol, in the presence of a small amount of strong acid for a short time and the resulting mixture is then added slowly to hot mineral acid and the desired alpha-halo acrylic ester is flashed over along with the water formed in the reaction. The preferred acids for use in this invention are the strong Lewis acids and mineral acids having ionization constants of from about $1 \times 10^{-4}$ and greater and the most preferred are sulfuric and phosphoric acids. The reaction between the alpha-halo beta-propiolactone polymer and alcohol in the process for forming alpha-halo acrylic esters is preferably carried out at the reflux temperature of the mixture. The depolymerization and dehydration reaction for the preparation of alpha-halo acrylic esters is carried out in the mineral acid which is maintained at a temperature of from about 140° C. to about 220° C. and more preferably at a temperature of from 150° C. to 200° C. In order to avoid excessive polymerization of the monomers prepared by the process embodied herein it is desirable to employ a polymerization inhibitor such as hydroquinone, p-tertiary butyl catechol, phenyl-beta-naphthyl amine, copper salts and the like in the reaction mixture.

The preferred alpha-halo beta-propiolactone polymers for use in the process of this invention are the alpha-chloro and alpha-bromo polymers and the most preferred is the alpha-chloro beta-propiolactone polymer.

The pure alpha-halo acrylic monomers embodied herein are purified conveniently by carefully distilling or recrystallizing the volatile portion which flashes over from the hot mineral acid reaction flask.

The alpha-halo acrylic acids and alpha-halo acrylate esters which are produced by the process embodied herein are useful in preparation of polymers which are useful as plastics, rubbers, adhesives and the like as well as other uses well known to the art.

The following examples will serve to illustrate the process of this invention.

*Example 1*

309.5 g. of alpha-chloro beta-propiolactone polymer having a molecular weight of about 1500 were dissolved in 116 g. of methanol and 60 g. of 85% phosphoric acid. The resulting mixture was refluxed gently for two hours and then added slowly to 85% phosphoric acid maintained at from about 150° C. to about 170° C. over a period of four hours. The reaction mixture was stirred during this period and the azeotrope which distilled at from 95 to 105° C. was collected in a receiver. The water-insoluble product, methyl alpha-chloroacrylate, boiled at 53–62° C. and 50 mm., $n_D^{20}$ 1.4404 (Literature 1.4400) and infrared analysis showed it was identical with a commercial sample of methyl alpha-chloroacrylate prepared by the dehydrochlorination of alpha,beta-dichloro methyl propionate.

During the above-described recovery of the methyl alpha-chloroacrylate some of the monomer polymerized to a solid polymer. Infrared analysis of this polymer showed it to be identical with a commercial sample of polyalphachloro methyl acrylate.

*Example II*

A sample of 108.5 g. of alpha-chloro beta-propiolactone polymer was added to a solution containing 48 g. of methanol, 2 g. of hydroquinone and 2 g. of 85% phosphoric acid. The resulting mixture was refluxed for 1.5 hours followed by distillation. The main fraction of high boiling material was collected at 53–62° C. and 50 mm. This fraction had a refractive index of 1.4401 and infrared analysis showed it to be methyl alpha-chloroacrylate.

In a similar manner ethyl alpha-bromoacrylate was prepared from alpha-bromo beta-propiolactone polymer, ethanol, phosphoric acid and p-t-butyl catechol.

*Example III*

A sample of 213 g. of alpha-chloro beta-propiolactone polymer in 80 g. of methanol was added slowly to 300 g. of hot sulfuric acid (160–180° C.). The azeotrope which was collected consisted of 131.3 g. of oil and 121.7 g. of water. The methyl alpha-chloroacrylate was collected at 52–69° C. at 55 mm. had a refractive index of 1.4410. Further purification gave polymerizable methyl alpha-chloroacrylate at 63–66° C. and 54 mm.

In a similar manner ethyl alpha-chloroacrylate, n-propyl alpha-chloroacrylate, isopropyl alpha-chloroacrylate and n-butyl alpha-chloroacrylate were prepared from alpha-chloro beta-propiolactone polymer and ethanol, n-propyl alcohol, isopropyl alcohol and n-butyl alcohol respectively.

*Example IV*

A 100 g. sample of alpha-chloro beta-propiolactone polymer and 1 g. of p-tert. butyl catechol were pyrolyzed at about 200° C. and 50 mm. pressure to yield about 70 g. of crude alpha-chloro acrylic acid which sublimed and was collected on a cold finger. The product was recrystallized from petroleum ether yielding needle crystals melting at 63–65° C.

In a similar fashion a 55% yield of alpha-bromo acrylic acid was prepared by pyrolyzing alpha-bromo beta-propiolactone polymer at reduced pressure in the presence of cuprous chloride and hydroquinone. The recrystal lized product melted at 70–71.5° C.

I claim:

1. The process for preparing a compound having the formula

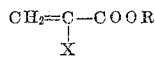

wherein X represents a halogen atom and R is a member selected from the class consisting of hydrogen and an aliphatic hydrocarbon group having from 1 to 8 carbon atoms said process comprising heating at a temperature of from 140 to 220° C. a member of the group consisting of (1) a polymer of the formula

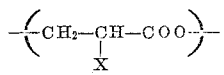

wherein X represents a halogen atom said polymer having a molecular weight of from about 800 to about 2,000 and (2) an aliphatic monohydric alcohol having from 1 to 8 carbon atoms and a polymer of the formula

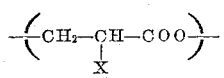

wherein X represents a halogen atom said polymer having a molecular weight of from about 800 to about 2,000.

2. The process for preparing a compound having the formula

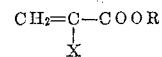

wherein X is a member of the group consisting of chlorine and bromine and R is a member selected from the group consisting of hydrogen and an aliphatic hydrocarbon group having from 1 to 8 carbon atoms said process comprising heating at a temperature of from 140 to 220° C. a member of the group consisting of (1) a polymer of the formula

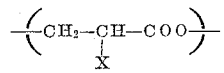

wherein X is selected from the group consisting of chlorine and bromine said polymer having a molecular weight of from about 800 to about 2,000 and (2) an aliphatic monohydric alcohol having from 1 to 8 carbon atoms and a polymer of the formula

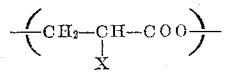

wherein X is a member of the group consisting of chlorine and bromine said polymer having a molecular weight of from about 800 to about 2,000.

3. The process for preparing alpha-haloacrylic acid comprising pyrolyzing alpha-halo beta - propiolactone polymer having a molecular weight of from about 800 to about 2,000 at a temperature of from 140 to 220° C.

4. The process for preparing alpha-halo-acrylic acid esters comprising heating a mixture of an alpha-halo beta-propiolactone polymer having a molecular weight of from about 800 to about 2,000, a strong mineral acid and an aliphatic monohydric alcohol having from 1 to 4 carbon atoms at a temperature of from 140° C. to 220° C.

5. The process for preparing alpha-chloroacrylic acid comprising pyrolyzing alpha-chloro beta-propiolactone polymer having a molecular weight of from about 800 to about 2,000 at a temperature of from 200° C. in the presence of a polymerization inhibitor.

6. The process for preparing alpha-bromo-acrylic acid comprising pyrolyzing alpha-bromo beta-propiolactone polymer having a molecular weight of from about 800 to about 2,000 at a temperature of about 200° C. in the presence of a polymerization inhibitor.

7. The process for preparing methyl alpha-chloroacrylate comprising reacting alpha-chloro beta-propiolactone polymer having a molecular weight of from about 800 to about 2,000 with methanol, distilling the azeotrope from an excess of strong mineral acid maintained at from 150 to 170° C. and separating the product from the water in the azeotrope.

8. The process for preparing ethyl alpha-chloroacrylate comprising reacting alpha-chloro beta-propiolactone polymer having a molecular weight of from about 800 to about 2,000 with ethanol, distilling the azeotrope from an excess of strong mineral acid maintained at from 150 to 170° C. and separating the product from the water in the azeotrope.

9. The process for preparing n-propyl alpha-chloroacrylate comprising reacting alpha-chloro beta-propiolactone polymer having a molecular weight of from about 800 to about 2,000 with n-propyl alcohol, distilling the azeotrope from an excess of strong mineral acid maintained at from 150 to 170° C. and separating the product from the water of the azeotrope.

10. The method for preparing isopropyl alpha-chloroacrylate comprising reacting alpha-chloro beta-propiolactone polymer having a molecular weight of from about 800 to about 2,000 with isopropyl alcohol, distilling the azeotrope from an excess of strong mineral acid maintained at from 150 to 170° C. and separating the product from the water of the azeotrope.

11. The method for preparing n-butyl alpha-chloroacrylate comprising reacting alpha-chloro beta-propiolactone polymer having a molecular weight of from about 800 to about 2,000 with n-butanol, distilling the azeotrope from an excess of strong mineral acid maintained at from 150 to 170° C. and separating the product from the water of the azeotrope.

12. The method for preparing methyl alpha-bromoacrylate comprising reacting alpha-bromo beta-propiolactone polymer having a molecular weight of from about 800 to about 2,000 with methanol, distilling the azeotrope from an excess of strong mineral acid maintained at from 150 to 170° C. and separating the product from the water of the azeotrope.

References Cited in the file of this patent

UNITED STATES PATENTS 2,858,255      Segui et al. _____ Oct. 28, 1958